United States Patent Office 3,412,034
Patented Nov. 19, 1968

3,412,034
METHOD FOR PRODUCING FINE PIGMENT
PARTICLES IN A LIQUID VEHICLE
Maurice Dwight McIntosh, Willoughby, Zenon Kazenas, Euclid, and Joseph L. Switzer, Gates Mills, Ohio, assignors to Switzer Brothers, Inc., Cleveland, Ohio, a corporation of Ohio
No Drawing. Continuation-in-part of applications Ser. No. 70,927, Nov. 22, 1960; Ser. No. 274,971, Apr. 22, 1963; and Ser. No. 291,272, June 28, 1963. This application July 15, 1966, Ser. No. 565,377
26 Claims. (Cl. 252—301.2)

This is a continuation-in-part of our U.S. Ser. No. 70,927, filed Nov. 22, 1960, (now abandoned); of our copending application U.S. Ser. No. 274,971, filed Apr. 22, 1963, now Patent No. 3,220,710, and our Ser. No. 291,272, filed June 28, 1963. Attention is directed to copending McIntosh (sole) applications Ser. No. 196,860 (filed May 21, 1962), now abandoned and Ser. No. 582,511 (filed Sept. 28, 1966).

The instant invention relates to fine particle production, and more particularly, to a method of producing an improved dispersion of finely divided solid particles in a liquid vehicle, and the composition obtained by carrying out such process.

Although the instant invention may have application in a number of fields, it is particularly useful in the manufacture of color compositions containing meltable resin pigments, which may be thermoplastic in certain instances. Such meltable pigments may be used in the production of coating compositions (i.e., including paints, printing inks, silk screen colors, etc.) having many useful properties. The pigments are formed of normally solid meltable organic resins in particulate form having dissolved, dispersed or fixed therein a suitable coloring agent, which in the case of a daylight fluorescent color is a fluorescent dye dissolved or dispersed in the pigment in concentrations effective for daylight fluorescence (as more fully described, for example, in Joseph L. Switzer et al. U.S. Patent No. 2,653,109, and Zenon Kazenas Patent No. 2,938,873, both of which patents are incorporated herein by reference).

Heretofore, such pigments have had the disadvantages found with most pigments that are ground by conventional grinding means, such as ball mills, pulverizers, air jets and the like in that there is a tendency to produce a wide range of particle sizes during such grinding. As grinding continues one does not reduce the larger particles alone but apparently the smaller as well as the larger particles are reduced in size. If the particle size is too large, then an unsatisfactory coating composition is produced, and extensive time is consumed in milling the composition to reduce the "average" particle size so that the large particles are not deleterious. On the other hand, in the case of daylight fluorescent pigments, if the particle size is too small, one obtains a color which is substantially less effective than the optimum color desired, and excessive pigment body.

In the past, in order to obtain a small and yet uniform particle sized pigment, various systems of classification or separation have been proposed. By the use of such systems, it is possible to obtain the desired particle size. The larger particles can be returned to the grinding system for reduction in size. The smaller particles are, however, unusable and must be either discarded or reworked into a gross form for regrinding. Generally speaking, such classification systems are expensive to operate and result in losses of expensive materials. In addition, in practical operation such systems give a fairly wide range of particle size.

The instant invention provides a novel method of obtaining a very fine generally uniform particle size for a normally solid meltable organic resin (either colorless or colored), which may be employed as a pigment for the purposes described. An important feature of the instant invention resides in the general uniformity of particle size, or the fine "cut" in particle size which may be obtained. For example, by the use of conventional grinding and air classification systems, one may obtain a pigment with an average particle size of 3 to 4 microns, although the actual range in particle size is from 15 to 20 microns down to a submicron size. In contrast, in the practice of the instant invention one may obtain an average particle size of 3 to 4 microns with substantially no particle less than 2 microns or more than 6 microns in size, and with the great majority of the particles within the 3 to 4 micron range.

The instant invention involves a method of producing an improved dispersion of solid particles in a liquid vehicle, which comprises developing a shearing action hereinafter referred to as agitating, as by mechanical stirring, homogenization, kinetic dispersion, ultrasonics, vibration and the like; in a mixture consisting essentially of a dispersible phase of normally solid meltable organic resin, which in certain instances may be thermoplastic, in molten form in a continuous phase that is formed of a solid-film-forming normally liquid vehicle (which when spread in a thin film is capable of binding the dispersed phase carried thereby to the surface to which it is applied) in which the dispersed phase is substantially insoluble (either in its solid or molten state) under the ordinary conditions of use, and then converting the completed dispersion, as for example by cooling, further chemical reaction, removal of a plasticizer or the like, whereby the dispersed phase changes from molten to solid particulate state. As previously mentioned, the practice of the instant invention results in a dispersion wherein a substantial improvement in uniformity of particle size is obtained.

An additional advantage resulting from the use of the instant invention in the preparation of coating compositions arises from the fact that coating compositions prepared according to the instant invention have improved texture in appearance. Paints so prepared may be found to have high gloss, even with a high pigment to vehicle ratio, so that they may be used to obtain an enamel-like effect without the necessity for using a clear overcoat. Although it is not desired to limit the invention to any particular theory, it is believed that the method of the instant invention results in the creation of particles of generally spherical form which are more transparent in the vehicle than the prior art particles which were mechanically fractured.

It is an important object of the instant invention to provide an improved method of producing a dispersion of solid particles in a liquid vehicle and an improved product resulting therefrom.

It is another object of the instant invention to provide an improved method of producing a coating composition by the production of a dispersion of normally solid meltable organic synthetic resinous pigment particles of substantially discrete fine generally uniform size in a solid-film-forming vehicle.

Yet another object of the instant invention is to provide a method of dispersing meltable resin pigment particles in a solid-film-forming normally liquid vehicle to obtain a paint, ink or other coating composition having improved properties.

Other and further objects, features and advantages of the present invention will become apparent to those skilled in the art from the following detailed disclosure thereof.

The invention consists in a method of producing an improved dispersion of solid particles in a liquid vehicle, which comprises (a) admixing a normally solid meltable organic synthetic resin, as a dispersible phase, in a continuous phase that is formed of a solid-film-forming liquid vehicle, (b) subjecting the admixture to a temperature increase in combination with agitation to effect the formation of a dispersed phase in the molten state and in relatively discrete, fine particle size, and then (c) cooling the admixture while retaining such relatively discrete, fine particle size, said cooled dispersed phase being substantially insoluble in the continuous phase, and the invention further consists in the product obtained by carrying out such method.

The dispersed phase used in the practice of the instant invention is formed of particles of a meltable organic synthetic resin that is normally solid, i.e., solid under the ordinary conditions of use such as room temperature, etc. For convenience this resin will often be referred to herein as th "first" resin or the "pigment" resin. This resin is a meltable resin in that it is capable of being softened by heat and converted to a molten state.

Although the pigment resin preferred for this purpose is a cocondensate of an aromatic sulfonamide, a polyamino triazine and formaldehyde, such as is described in Zenon Kazanas U.S. Patent Nos. 2,809,954 and 2,938,-873, it will be appreciated that other organic resins may be used in the practice of the instant invention. For example, one may use thermoplastic resinous condensates of formaldehyde and aromatic sulfonamides such as o-toluenesulfonamide, p-toluenesulfonamide, mixtures thereof, sulfanilamide, benzenesulfonamide and alkyl derivatives thereof, in which the sulfonamide group is attached directly to the aromatic nucleus through the sulfur atom and there are two reactive amide hydrogens, as well as the corresponding alpha toluenesulfonamide compounds, all of such compounds being referred to hereinafter as aromatic sulfonamides.

In addition, the meltable pigment resin which may be used in the dispersed phase in the practice of the instant invention may be a cocondensate formed of an aromatic monosulfonamide component, a formaldehyde (or paraformaldehyde) component, and a polyamino resin forming component, which is a compound containing a plurality of amino (or amido) groups each attached to a carbon atom which in turn is attached through a double bond to an oxygen, sulfur or nitrogen atom. The last mentioned compounds include urea (wherein two amino groups are attached to a carbon atom which in turn is attached to oxygen by a double bond), thiourea (wherein two amino groups are attached to a carbon atom which in turn is attached to a sulfur atom by a double bond), and guanidine (wherein two amino groups are attached to a carbon atom which in turn is attached to an NH group by a double bond). Such polyamino compounds (often also referred to as "polyamido" compounds) ordinarily form thermosetting resins with formaldehyde; but in the practice of the instant invention they may be used in cocondensation products with aromatic sulfonamides in such proportions as to produce a thermoplastic resin, in accordance with the general teachings of the aforementioned Kazenas patents.

Other polyamino compounds which may be used for cocondensation include dicyandiamide, biuret, etc. Preferred polyamino compounds for use in the practice of the instant invention are, however, compounds wherein the molecule has a plurality of $NH_2$ groups each connected to a carbon atom contained in a heterocyclic ring, said carbon atom being connected by a double bond to an intercyclic nitrogen atom. The heterocyclic rings thus include triazole, diazole, diazine and triazine rings. Such compounds include guanazole, 1-phenylguanazole, 4-aminoguanazole, 1 - carbamylguanazole, 1 - guanylguanazole, 1-acetylguanazole, 1-benzolguanazole, 2,4-diamino-6-hydroxypyrimidine, melamine and the guanamines such as those disclosed in Kazenas Patent No. 2,938,873.

Another group of compounds which can be used in the preparation of meltable pigments resins for use hereunder are water insoluble substantially complete condensation products of the cyclic ureides such as dimethyl hydantoin, ethylene, urea acetylene diurea, etc., i.e., resin-formers containing a plurality of —NH— groups each attached to a carbon atom, which in turn is attached by a double bond to =O, =NH or =S. Preferably, each such carbon atom and —NH— group are intracyclic and the =O, =NH or =S groups are exocyclic in heterocyclic rings.

The formaldehyde component used may be formaldehyde or a formaldehyde generating derivative thereof such as paraformaldehyde, hexamethylene tetramine, or the like.

As mentioned, the meltable pigment resins preferred for use in the practice of the instant invention are those described in Kazanas Patent Nos. 2,809,954 and 2,938,-873 (which patent disclosures are included herein by reference), wherein the polyamino components is a polyaminotriazine component, defined in such patents as an aminotriazine having at least two amino groups.

The amount of such polyamino component in the thermoplastic pigment resin is generally an amount insufficient to render the resin thermosetting, but sufficient to impart substantial insolubility to the resin in common petroleum solvents, which are often used in paint vehicles.

Conventional aromatic sulfonamide-formaldehyde resins, such as the toluenesulfonamide-formaldehyde resins, have relatively low softening points. This affords an advantage in that these resins may be readily converted to the molten state in the practice of the instant invention, although there may be some disadvantages in the use of materials having such low melting or softening points in coating compositions. On the other hand, the incorporation of the polyamino compounds or components in the meltable pigment resins used in the practice of the instant invention causes the formation of resins having higher softening points, so that higher temperatures may be required in the practice of the instant invention, but the coating composition ultimately formed may have additional advantages.

The formaldehyde component should preferably be used in the practice of the instant invention in a ratio of about one molecule per molecule of aromatic sulfonamide, plus at least about 1 and preferably 2 or more molecules of formaldehyde per molecule of polyamino component (under which circumstances one may obtain a completely condensed or cocondensed resin). If a lower proportion of the formaldehyde component is used in the resin, this will ordinarily result in a resin of lower softening point which may be processed advantageously in the practice of the instant invention because of its lower softening point. Accordingly, it may be advantageous in many instances to prepare an initial thermoplastic resin for the dispersed phase that has less than the amount of formaldehyde herein specified to process the dispersed phase in accordance with the instant invention, and then add to the system additional formaldehyde or formaldehyde-generating material which will in turn react with the dispersed phase resin to effect the formation of a completely condensed pigment resin having a higher softening point than the starting material and improved light stability and other improved properties.

The continuous phase, in which the aforementioned meltable pigment resin is dispersed in the practice of the instant invention, for example, is a solid-film-forming normally liquid vehicle, which may, in certain uses consist of a normally liquid solvent material that has been thickened by a resinous-forming or resinous material so as to increase the viscosity thereof. It will be understood that by normally liquid, we mean liquid under ordinary conditions of use such as room temperature. Increased viscosity in the continuous liquid phase materially assists in effecting the desired dispersion and formation of discrete generally uniform particle size of the dispersed phase during agitation in accordance with the practice of the invention. The liquid vehicle forming the continuous phase is a material in which the dispersed phase is substantially insoluble under the conditions of steps (a) and (c), and preferably usually step (b). In other words, the dispersed phase is substantially insoluble in its normally solid form (as well as often in its molten form in the continuous phase, when the same is in its original liquid form or when it is in its ultimate solid-film form).

Typical examples of the continuous phase are ordinary vehicles of the paint and ink trade, such as oil modified alkyd vehicles, styrenated alkyd vehicles (substituted or unsubstituted styrenes), cyclized rubber vehicles, and the like, which ordinarily contain petroleum solvents, drying oils and/or similar liquid solvents. In general, the continuous phase consists essentially of or comprises a binder for the pigment or dispersed phase. It is ordinarily liquid at room temperature as well as the temperature at which the dispersed phase is molten, usually being a viscous liquid material that is solidifiable in whole or in part in ultimate use, in that it is a solid-film-former of the type used in coating compositions, paints, inks, etc.

Generally, the continuous phase may be formed of an organic resin dissolved in and/or thinned with a liquid solvent therefor. One aspect of the instant invention involves maintaining in solution in the liquid continuous phase an organic resin (hereinafter often referred to as the "second" resin or "solid-film-forming" resin) to maintain a substantial viscosity in the continuous phase, thereby to effect, in combination with the agitation, a shearing action to bring about the desired reduction of the molten dispersed phase to substantially discrete, generally uniform fine particle size. The proportion of such second resin employed in the liquid phase affords a control for the viscosity in the liquid phase in the practice of the invention. The continuous phase may be formed of varnish compositions containing solid-film formers such as vinyl toluene and styrene copolymers, etc. Modified phthalic anhydride linseed oil, soya oil or dehydrated castor oil alkyd varnishes and the like may be used. Preferred for use in the practice of the invention are styrenated oil-modified alkyds such as those described in U.S. Patent Nos. 2,919,253 and 2,944,991, in which oil-modified alkyds copolymerized with styrene and/or ring substituted alkyl or halostyrenes are disclosed; the term "styrenated" as herein used shall be understood to include modification by styrene as well as ring substituted alkyl or halo styrene.

EXAMPLE 1

A charge of 160.5 grams of a mixture of o- and p-toluenesulfonamide, 0.7 gram of hexamethylene tetramine and 15.38 grams of paraformaldehyde (95% active) was heated with stirring to a temperature of about 112° C. and then a charge of 39.2 grams of an A-stage unmodified melamine-formaldehyde resin (Resimene 814) was added with further stirring and the reaction mixture was raised to a temperature of 176–178° C., held there for seven minutes, and permitted to cool to room temperature. The resulting resin has a softening point of 96.5° C. and is a brittle friable material that is ground into a powdered form.

A charge of 200 parts by weight of the aforementioned powdered resin and 180 parts by weight of an ink vehicle, consisting essentially of 44% by weight of styrenated alkyd copolymer resin (resin component of Cycopol 341–17) and 56% by weight of a high boiling (about 300° C.) saturated aliphatic hydrocarbon ink solvent (commercially available as "Inkol–O") is blended in a Pony mixer and then placed in a conventional high speed paint dispersing mill in which it is heated up to a temperature of about 100° C. as a result of the dispersing effect of the mill on the charge. An additional charge of 100 parts by weight of the powdered resin is added to the mix, and the disperser is then operated at high speed to allow the mixture or dispersion therein to rise to a temperature of 165–170° C., which takes about 15 to 20 minutes. Cooling water is then applied to reduce the temperature of the dispersion to about 150° C., and the agitation is cut back to low speed and a charge of 54 parts of boiled linseed oil is then mixed into the dispersion, and it is cooled to approximately room temperature.

In the resulting dispersion, it is found that the particle size of the melamine-sulfonamide-formaldehyde resin dispersed phase is about 80 to 90% within the range of 2 to 5 microns, with substantially no particle sizes above 6 microns or below 1½ microns.

The resulting dispersion is in the form of a concentrate, which is diluted to approximately 50 weight percent of pigment resin solids with "Inkol–O" in order to obtain a material of composition suitable for use as printing ink.

In the manufacture of printing ink, it will be appreciated that conventional dryers, flow control agents, solvents, varnishes, ets., are also added. In addition, of course, the coloring material must be added. Using the process just described, if a dye combination of 2.73 grams of Brilliant Yellow 6G Base (4-amino-1,8-naphthal-2', 4'-dimethylphenylimid) and 1.05 grams of Rhodamine 6GDN Extra (Colour Index No. 752) and 1.29 grams of Rhodamine B Extra (Colour Index No. 749) is added during the resin preparation as more fully described in U.S. Patent Nos. 2,809,954 and 2,938,873, the results obtained are the same as those just described except that the melamine-sulfonamide-formaldehyde resin dsipersed phase ultimately obtained is in the form of discrete spherulized pigment particles which retain the dyes and which exhibit an orange color that is strongly daylight fluorescent when the final ink product is applied to surfaces by various printing methods. In addition, if instead of adding the dyes during the resin preparation, these dyes are added to the mixture in the disperser prior to the vigorous agitation, it is found that during the agitation the dyes migrate to the molten melamine-sulfonamide-formaldehyde resin particles in the dispersed phase, which absorb or otherwise retain the dyes so as to form colored pigments, having the particle size properties hereinbefore described. This procedure has the advantage that the end user of a pigmented composition, such as the instant ink composition, may purchase the pigment resin in uncolored form from a supplier and then effect the coloring thereof with the desired dye or dye combination, while carrying out the method of the instant invention for obtaining a dispersion of the pigment particles of generally uniform size. The pigment resin in the dispersed phase is capable of retaining the dye in concentrations effective for daylight fluorescence and is further capable of selectively absorbing the dye from the continuous phase, so that the resulting ink composition holds substantially all of the dye within the dispersed pigment particles.

EXAMPLE 2

If, instead of the dye combination referred to in Example 1, the procedure described is carried out using 2 grams of malachite green (Colour Index No. 657) either in the preparation of the resin or during the dispersing procedure (in accordance with the procedures outlined in Example 1), the resulting product has the characteristic green color of the dye and it is found that the dye is retained substantially entirely within the pigment resin spheroidal particles. The particles of the thermoplastic pigment resin are, of course, capable of conversion to the molten state by heating of the composition (for example, during the agitation process), although the pigment resin in either solid or molten state is substantially insoluble in the continuous liquid phase, and such pigment resin is capable of selectively absorbing the dye from the continuous phase and substantially preventing the dye from migration back into the continuous phase.

EXAMPLE 2A

A charge of 133.5 grams of a mixture of o- and p-toluenesulfonamide is heated with stirring to a temperature of about 112° C., a charge of 24.15 grams of paraformaldehyde (95% active) is added slowly with stirring and then a charge of 18.9 grams of melamine were added with stirring. The reaction mixture was raised to a temperature of 145–150° C. and 1.65 grams of Rhodamine B Extra and 1.57 grams of Rhodamine 6GDN were added. The reaction mixture was then raised to 160° C.

A charge of 50 parts by weight of the aforesaid resin (crushed) and 35 parts of an ink vehicle, consisting essentially of 44% by weight of a styrenated alkyd copolymer resin and 56% by weight of a high boiling saturated aliphatic hydrocarbon ink solvent are heated with agitation to about 170° C. until the dispersion is completed. The heat is removed and 10 parts of boiled linseed oil are added with slow stirring while the temperature is allowed to drop to 130° C. A charge of 4 parts of paraformaldehyde (95% active) is added slowly with stirring and the temperature is raised to about 150° C. and held for about 10 minutes. Heat is again removed and while cooling, a charge of 13 parts of the high boiling saturated aliphatic hydrocarbon ink solvent is added.

It is found that the paraformaldehyde is distributed to the system and absorbed by and reacted with the melamine-sulfonamide-formaldehyde resin particles to effect an increased softening temperature in the pigment resin in the final product. Since the reaction between the additional paraformaldehyde and the pigment resin does not take place to an appreciable extent until the pigment resin has been converted to the molten state and dispersed in the process, the ultimate spheroidal fine particle size of the pigment resin in the final product is not appreciably altered by this reaction and the reaction does not result in agglomeration or other undesirable side effects.

EXAMPLE 3

A procedure is carried out that is the same as that described in Example 1, except that during the high speed dispersing in the paint dispersing mill, the temperature is permitted to rise only to about 150° C., and it is found that the resulting spherulized pigment resin particles in the dispersed phase are substantially larger in size, having an average particle size of about 20 to 30 microns. Such composition contains pigment particles that are too large for most conventional ink uses, but the composition itself is suitable as a brushing paint or similar type of coating composition. The instant procedure demonstrates that variations in temperature during the vigorous agitation may be used to effect variations in the average spheroidal particle size in the end product. The temperature employed during the vigorous agitation should be above the softening point, to the extent necessary to effect conversion of the pigment resin from the solid to the molten state. There are, however, different degrees of fluidity in the molten state depending upon the temperature employed during the agitation operation, and this temperature is thus a factor controlling the ultimate average spheroidal particle size in the product.

Increases in the temperature during the agitation, like increases in the viscosity of the continuous phase (as demonstrated in Example 6), can reduce the average particle size in the end product.

EXAMPLE 4

A procedure is carried out that is the same as that of Example 1, except that the melamine-sulfonamide-formaldehyde pigment resin starting material has a softening point of only about 80° C. This resin may be formed by the use of less than the amount of paraformaldehyde specified, or less than the amount of melamine specified; thus by using 29 grams of trimethylol melamine instead of 39.2 grams of the A-stage unmodified melamine-formaldehyde resin specified in Example 1. It is found that the resulting ink composition contains the pigment resin particles in an average particle size of about 1 micron.

It will thus be seen that the softening point of the pigment resin may also be used to vary the ultimate average particle size of the pigment resin in the composition.

EXAMPLE 5

A melamine-sulfonamide-formaldehyde resin is prepared in accordance with the procedure of Example 1; and, instead of cooling and powdering the resin in solid form, this resin is introduced into the vehicle in the dispersing mill in molten form. In such procedure, 300 parts by weight of the pigment resin (with or without the dye incorporated therein) is heated to about 140° C. to melt the same. A charge of 180 parts by weight of the vehicle of Example 1 (i.e., 44 weight percent styrenated oil-modified alkyd resin and 56 weight percent "Inkol-O") is maintained in the paint dispersing mill at approximately 100 to 120° C., at low speed, and the molten pigment resin charge is added thereto, whereupon the disperser is turned onto high speed and the temperature is permitted to rise to 165–170° C., in the manner described in the procedure of Example 1; and the remainder of the procedure of Example 1 is carried out to obtain results substantially the same as those described.

In the practice of the instant invention, the pigment resin may be heated alone first to melt the same and when it is then introduced into the continuous phase in a suitable dispersing mill, the heat of the molten resin may provide some or all of the heat required to maintain the pigment resin in a molten dispersed state so that reduction to the generally uniform fine particle size may be effected during high speed agitation in the disperser.

A similar result can be obtained by introduction of the vehicle into the molten resin. Because of the cooling effect resulting from the introduction of a cold vehicle it may be desirable to either preheat the vehicle or heat the resin to about 160° C.

EXAMPLE 6

A pigment resin is prepared by carrying out the procedure of Example 5 of Kazenas Patent No. 2,809,954, which results in a resin having a softening point of about 112° C. The resin is reduced to powdered form and a charge of 200 parts by weight of the powdered resin and 158 parts by weight of a liquid vehicle (consisting essentially of 50 weight percent commercial styrenated oil-modified alkyd resin and 50 weight percent "Inkol-O") is blended in a Pony mixer and then transferred to a conventional high speed paint dispersing mill, in which it is agitated to bring the charge up to a temperature of about 100° C. Then an additional charge of 100 parts by weight of powdered resin is added to the mill and agitation is carried out at high speed, allowing the temperature to rise to about 165–170° C. over a period of about 20 minutes. Then by the use of external cooling water the charge is cooled to about 150° C.; the disperser is turned back to low speed; and 22 parts by weight of "Inkol-O" and 54 parts by weight of boiled linseed oil are added to the disperser and mixed into the charge. This results in a pigment resin concentrate, which may be diluted to approximately 50 weight percent of pigment resin solids with "Inkol-O" (plus the addition of conventional dryers, flow control agents, etc.) in order to obtain a composition having suitable texture, viscosity, and other physical properties for use in conventional printing ink processes. It is found that the resulting particle size of the resin pigment spheroidal particles in the composition is 3 to 6 microns, with a very nominal percent of particles outside of this range.

If the foregoing procedure is repeated except that the dispersion is permitted to rise to 180° C. during high speed agitation in the disperser, it is found that the resulting average particle size of the spheroidal pigment resin particles in the composition is reduced to from 2 to 5 microns.

A suitable dye is added in the foregoing procedure, during the production of the pigment resin when the reaction mixture has reached a temperature of between 150° C. and 160° C., while being heated up to 170° C. At this point a dye combination of 1 weight percent of the resin of Rhodamine B Extra (Colour Index No. 749) and 1 weight percent of Rhodamine 6GDN Extra is added to the reaction mixture; and it is found that the pigment resin retains the dye during the subsequent processing herein described and, when the utimately formed ink composition is applied to a surface in the conventional manner, it is found that the ink has a strongly daylight fluorescent bluish-red color.

Substantially the same results are obtained by adding the dye combination to the charge in the high speed paint dispersing mill in the foregoing procedure at the time that the additional charge of 100 parts by weight of pigment resin is added just prior to high speed agitation. The dye combination has greater affinity for or solubility in the pigment resin, particularly when the pigment resin is in the molten state. Also, the addition of the dye combination to the system does not interfere with or materially alter the formation of the substantially discrete, fine uniformly sized, generally spherical pigment resin particles in the composition; and the instant method of processing the pigment resin particles into substantially discrete, fine uniformly sized spheroidal particles imparts superior optical characteristics to the composition when applied to a surface as an ink.

EXAMPLE 7

The procedures of Example 6 are carried out using, in place of the "Inkol-O" in each case, a commercially available aromatic petroleum solvent having a K.B. value of 70 to 90, and it is found that substantially the same results are obtained. A charge of 30 grams of a vehicle consisting of 50% styrenated-alkyd resin in an aromatic petroleum solvent with a K.B. value of 74.5 and 50 grams of the resin described in Example 17 herein are heated with agitation to 155° C. and held for about 10 minutes. Upon completion of the dispersion, the heat is removed and as it is cooling 10 grams boiled linseed oil and 10 grams "Inkol-O" are slowly added. By the addition of further thinners, dryers and the like a satisfactory ink can be produced.

EXAMPLE 8

Substantially the same results as those described in connection with Example 6 are obtained by carrying out the procedure of Example 6, except that the dispersion temperature is about 150° C. and the vehicle used in the high speed dispersing operation consists essentially of a commercial styrenated long oil alkyd (50% solids in mineral spirits), and after the high speed dispersing in the mill, the concentrate is diluted with 60 parts by weight of mineral spirits in place of the boiled linseed oil-"Inkol-O" combination specified in Example 6. The styrenated alkyd resin component is a semidrying soya dehydrated castor oil alkyd modified with 40 weight percent of vinyl toluene ("Scopol 66 NM"). (In the preferred procedure, the styrene component is at least about 20% of the oil-modified alkyd component.)

In the procedure of the foregoing paragraph, substantially the same results may be obtained by replacing the alkyd resin component with a phthalic anhydride-dehydrated castor oil alkyd or a phthalic anhydride-linseed oil alkyd.

EXAMPLE 9

A pigment resin is prepared by carrying out the procedure of Example 1 of Kazenas Patent No. 2,809,954; and if this resin is used as the pigment resin in the procedures of Example 6 herein, it is found that substantially the same results are obtained. The same is true using resins prepared in accordance with Examples 3, 4 and 6 of Kazenas Patent No. 2,809,954. Using the resin of Example 2 of Kazenas Patent No. 2,809,954, however, in the procedure of Example 6 herein results in the formation of pigment resin spheroidal particles in dispersion that are on the average smaller (the reason for this being the lower softening point of the resin itself).

Other daylight fluorescent dyes or combinations thereof may be used in place of the dyes or combinations of dyes which have been used in the previous examples. For example, each of the foregoing procedures may be carried out to obtain substantially the same results as those already described, except for differences in the daylight fluorescent color obtained, using any of the following dyes:
Rhodamine B Extra,
Rhodamine 6GDN,
Xylene Red,
Brilliant Yellow 6G base (Azosol Yellow 6G),
  which is sometimes referred to herein as simply "6G,"
  and other fluorescent dyes of the xanthene and naphthalimide classes.

EXAMPLE 10

A charge of 5.2 moles of a mixture of o- and p-toluenesulfonamide is heated to 120° C. At such temperature 1 mol of melamine is added and the resulting charge is maintained at 120° C. for 15 minutes with agitation. Then, a charge of 6.2 mols of paraformaldehyde is added in six approximately equal portions over a period of 20 minutes, while maintaining the temperature at about 115–120° C. with agitation. After all of the paraformaldehyde is added, the temperature is raised to 170° C. for about 15 minutes. The resulting resin has a softening point of about 90° C.

If a procedure is carried out that is the same as that described in Example 1, except that the aforementioned resin is used as the pigment resin, the results obtained are substantially the same except that substantially all of the particles are within the size range of 1½ to 4 microns.

EXAMPLE 11

A charge of 300 parts by weight of a powdered commercial toluenesulfonamide-formaldehyde resin (Santolite MHP) and a liquid vehicle consisting essentially of 200 parts by weight of commercial "Scopol 55N/290" a (semidrying dehydrated castor oil esterified with glycerol and copolymtrized with 20% of vinyl toluene in a 60% solids solution in a 260–290° C. petroleum distillate) is subjected to high speed agitation in the paint dispersing mill for a period of 20 minutes, during which the temperature of the charge is permitted to rise to 150° C., and the material is then cooled substantially to room temperature, with continued agitation, and it is found that the resulting product contains fine spherulized toluenesulfonamide-formaldehyde resin in the dispersed phase in an average particle size of about 1 micron.

EXAMPLE 12

Substantially the same results as those described in Example 11 are obtained using, instead of the toluenesulfonamide-formaldehyde resin, a resin prepared according to the following procedure and using a maximum high speed dispersing temperature of 160° C.

A charge of 2 mols of a mixture of o- and p-toluenesulfonamide is heated to 120° C. At such temperature 1 mol of dimethylol urea is slowly added with stirring and the resulting charge is heated to 140° C. with agitation, by which time the mixture is clear.

Comparative results are also obtained using the foregoing procedure except that, in place of the urea, a corresponding molar proportion of methylol compounds of thiourea, guanidine, guanazole, dicyandiamide or any of the other previously mentioned polyamino resin forming compound is used.

In addition, a suitable dye, such as the dye combination of 1 weight percent of the resin of Rhodamine B Extra and 1 weight percent of the resin of Rhodamine 6GDN Extra (described for use in Example 6) may be incorporated in each of the resins mentioned in Examples 11 and 12 hereof, at the time the pigment resins are in the molten state, so as to obtain a composition possessing daylight fluorescent color when applied as a coating to a surface.

EXAMPLE 13

A charge is prepared of 30 grams of o- and p-toluenesulfonamide-formaldehyde resin ("Santolite MHP") and 90 grams of a 50% solids commercial cocondensation product of a long (soya) oil alkyd with a long chain alcohol modified ureaformaldehyde condensate in mineral spirits ("Duraplex DX656"). The charge is heated to 85° C. with stirring in a Brookfield counter-rotating mixer and held for about 10 minutes to obtain a good emulsion. A dye combination of 0.282 gram of Rhodamine B Extra and 0.093 gram of Rhodamine 6GDN Extra is then added and the charge is reheated to 85° C. by stirring, after which the material is permitted to cool to room temperature with stirring. Under 1000 magnification in a microscope, it is found that the particles are substantially all 1 to 1.5 microns in size.

The material can then be thinned and other materials such as dryers and the like added to produce an ink with the desired working properties.

EXAMPLE 14

A charge of 40 grams of toluenesulfonamide-formaldehyde resin (MHP), 0.28 gram of Rhodamine B Extra and 0.22 gram of Rhodamine 6GDN Extra is heated with stirring to 150° C. until the dyes have dissolved in the resin. The molten resin is then placed in a Brookfield counter-rotating mixer and to this is added 50 grams of the commercial alkyd of Example 13 plus 10 grams of an aliphatic naphtha (360°–410° F.) having a K.B. value of 33; and the material is stirred in the mixer for about 10 minutes at 85–90° C. Upon cooling with stirring it is found that the largest particles in the dispersed phase are about 6 microns and the smallest particles are about 1 micron in size, with an average of about 3 microns.

If the previously described charge is heated to 100° C. in the mixer, after the addition of 3.5 grams of magnesium oleate thereto, and retained at 100° C. in the mixture for about 5 minutes, it will be found that the color is improved and the particle size is now substantially entirely 1 to 1.5 microns.

Comparable results are obtained by carrying out the procedure just described except that the o- and p-toluenesulfonamide-formaldehyde resin is replaced by a corresponding amount of other sulfonamide-formaldehyde resins. The sulfonamides are (mono-nuclear) aromatic sulfonamides formed of a sulfonamido group attached to a benzene or benzyl group which may have one or two $C_1$–$C_4$ alkyl groups attached to the benzene nucleus. For example, comparable results are obtained using o-toluenesulfonamide, difunctional-sulfanilamide, benzene sulfonamide or p-ethyl benzene sulfonamide as the sulfonamide component wherein the extra-cyclic substituent (e.g., alkyl, amino, etc.) are substantially inert functionally in the amine-aldehyde condensation reaction here involved.

EXAMPLE 15

A charge of 295 grams of benzenesulfonamide and 1.4 grams of hexamethylene tetramine is heated to 152° C. and 30.76 grams of paraformaldehyde (95%) are added slowly to the reaction mix, dropping the temperature to about 112° C. but retaining a liquid reaction mix. Then a charge of 78.4 grams of commercial A-stage melamine-formaldehyde condensation product (Resimene 814) and 5.436 grams of Brilliant Yellow 6G base is added to the reaction mix and the same is heated to 145–150° C., at which temperautre there is added a dye combination of 0.8697 gram of Rhodamine 6GDN Extra and 2.174 grams of Rhodamine B Extra. The reaction mix is then heated to 175–180° C. and held for 10 minutes.

A charge of 200 parts by weight of the aforementioned pigment resin in powdered form and 180 parts by weight of an ink vehicle (consisting essentially of 44 weight percent of commercial styrenated oil-modified alkyd resin (U.S. Patent No. 2,919,253) and 56 weight percent of "Inkol-O" solvent) is blended in a Pony mixer and then placed in a conventional high speed paint dispersing mill in which it is heated up to a temperature of about 100° C. as a result of the frictional effect of the mill on the charge. Then 100 parts by weight of additional ground pigment resin is added to the charge and mill is next operated at high speed to allow the mixture or disperson therein to rise to a temperature of 170° C., at which it is maintained until the dispersion therein is capable of forming a clear film. The charge is then cooled to 150° C. with stirring and 54 parts by weight of boiled linseed oil is stirred in. It is found that the particle size ranges from 1 micron to 6 microns and the average particle size of the dispersed phase is 2 to 4 microns.

The product of the previous paragraph is a concentrate which may be used in the production of an ink. In preparing an ink, 100 grams of the concentrate, 4 grams of boiled linseed oil and 6.5 grams of calcium stearate (plus conventional small amounts of lead in cobalt dryers and an antioxidant) are thoroughly mixed together.

EXAMPLE 16

If the procedure of the previous example is carried out using in place of the styrenated alkyd vehicle described therein an "Alpex" resin vehicle, it is found that substantially the same results are obtained. The "Alpex" resin vehicle is a 60% solids resin solution formed of caoutchouc hydrocarbon polymers or "Polyprenes" having a few long side chains converted to a ring structure, in a petroleum distillate (470–507° F. having a K.B. value of 28).

If the procedure of the previous example or the procedure of Example 9 is carried out using in place of the vehicle described therein a "Trianol 3" resin vehicle, it is found that substantially similar results are obtained. The "Trianol 3" resin vehicle reportedly is an iso-phthalic long oil alkyd, 100% solids No. 3 viscosity.

EXAMPLE 17

A charge of 321 grams of toluenesulfonamide and 1.4 grams of hexamethylene tetramine are heated until melted, and a charge of 58.2 grams of an A-stage unmodified melamine-formaldehyde resin (Resimene 814) is added with stirring. Then a charge of 65.2 grams of paraformaldehyde (95%) was added at 112–115° C., slowly with stirring; 7.88 grams of Brilliant Yellow 6G base is added at about 120° C. and 0.945 gram Rhodamine 6G and 2.366 grams Rhodamine B Extra are added at about 145° C. with two drops of 70% phosphorous acid. The mix is heated to 170–175° C. for about 10 minutes.

A charge of 50 grams of the above resin in powdered form and 30 grams of a 50% solution of cyclized rubber (Alpex) in "Inkol-O" are heated with agitation to 175° C. until the pigment resin is dispersed. Heat is removed and at about 150° C. there is added with stirring 10 grams boiled linseed oil and 5 grams "Inkol-O". Suitable thinners and dryers can be added to produce a satisfactory printing ink.

EXAMPLE 18

A charge of 53 grams of monomethylol dimethyl hydantoin and 114 grams of o- and p-toluenesulfonamide is heated to 130° C. with stirring, and 10 grams of paraformaldehyde (95% active) are added slowly and the reaction mixture is then heated up to 170° C. and held until a clear solution is obtained.

In preparing a varnish in accordance with the practice of the instant invention, a commercial styrenated oil-modified alkyd is used which is a material available under the trade name "Cycopol-341-17" (50% solids styrenated oil-modified alkyd in naphtha). A charge of 100 parts by weight by "cycopol" and 100 parts by weight of the powdered resin prepared according to the previous paragraph is subjected to high speed agitation in a conventional paint dispersing mill to raise the temperature of the mix to 130–140° C. The agitation is continued at this temperature until a generally uniform dispersion is obtained and it is found that the material so obtained is a clear gloss "overprint" varnish which dries free of tack.

EXAMPLE 19

A charge of 52.7 grams of monomethylol dimethyl hydantoin and 10.5 grams of paraformaldehyde is heated together with stirring to a temperature of 140° C. Then 114 grams of p-toluenesulfonamide are added and the mix is heated to 150° C. with stirring. Next, 3 grams of Brilliant Yellow 6G base are added and the mix is heated to 170° C. Then 5 grams of paraformaldehyde are added to the reaction mix with stirring and it is held at 170° C. for 10 minutes, after which time a dye combination of 0.66 gram of Rhodamine 6GDN and 0.99 gram of Rhodamine B Extra is added and the reaction mix is held at 170° C. for another 10 minutes.

If the previously described resin is crushed to form a coarse powder and processed with a "Cycopol" vehicle in accordance with the procedure of previous Example 18, it is found that an excellent flexographic printing ink is obtained.

EXAMPLE 20

A resin is prepared by carrying out the procedure of Example 5 of Kazenas Patent No. 2,809,954, except that the proportions of materials used are 133.5 grams of o- and p-toluenesulfonamide, 24.5 grams of paraformaldehyde and 18.9 grams of melamine. The resulting resin is cooled and crushed to powdered form.

A charge of 70 grams of the aforementioned powdered resin, 1.12 grams of Brilliant Yellow 6G base, 0.28 gram of Rhodamine 6GDN and 0.42 gram of Rhodamine B Extra (plus one drop of 70% phosphorous acid) is heated together up to 170° C. and to this molten material (in a high speed dispersion mill) is added 42 grams of the previously described "Cycopol" vehicle (44% solids). The resulting dispersion is subjected to the action of the mill to obtain a clear dispersion which is then cooled to 150° C., with stirring, and then a charge of 13 grams of boiled linseed oil and 13 grams of "Inkol-O" is added with stirring; and it is found that the resulting product may be converted to an excellent printing ink (by addition of calcium stearate in accordance with the previously outlined procedure of Example 15).

EXAMPLE 21

A charge of 66.75 grams of a mixture of o- and p-toluenesulfonamide and 0.29 gram of hexamethylene tetramine are heated to 120° C. Then 12.70 grams of paraformaldehyde (95% active) is added slowly, with stirring, and maintained at such temperature for about 20 minutes. A charge of 3.00 grams of Lithosol Brilliant Blue E is then added to the resin and dispersed. To the resulting resin, at 115–120° C., is aded a charge of 9.45 grams of melamine, and the mixture is then heated up to about 170° C., for 15 minutes. The resulting material is a brilliantly colored resin having a softening point of about 100° C.

A charge of 100 parts of the foregoing resin crushed to a coarse powder and 60 parts of a vehicle (50% solids) of a commercial oil-modified alkyd copolymerized with vinyl toluene in "Inkol-O" is subjected to agitation in a conventional paint dispersing mill to raise the dispersion to a temperature of 180° C. The dispersion is then cooled to 150° C. and 18 parts of boiled linseed oil are added.

A process blue printing ink is prepared by mixing in a three-roll paint mill a charge of 100 parts of the aforementioned concentrate, 5 parts of boiled linseed oil and 6 parts of calcium stearate.

EXAMPLE 22

Comparable results are obtained by carrying out the procedure of the previous Example 21, except that the pigment resin used is prepared as follows:

A charge of 2 mols of a mixture of o- and p-toluenesulfonamide is heated to about 115° C. and to this is added 1 mol of dimethylolurea. The addition is made slowly with constant agitation and the temperature raised to about 140° C. At the same time Brilliant Yellow 6G base (in an amount equal to 6% by weight of the total resin) is added. The resulting resinous product is cooled and powdered prior to dispersion in the manner described in Example 21; and as in the case of Example 21, it is found that the resulting dispersion (and the ink made therefrom) has discrete, generally uniform pigment particle size in the dispersed phase.

It will be appreciated that the foregoing compositions may be used in other coating compositions, such as paints, etc., in each case with a suitable vehicle which is a film-forming composition, capable of binding the pigment particles together and to the surface coated thereby. The vehicles are capable of transmitting visible and/or ultraviolet light and in the finally dried form, such vehicles act as the solid film-forming binders. The same is true for subsequent examples.

EXAMPLE 23

A resin containing benzoguanamine, as a polyamino resin former, is prepared by carrying out the procedure of Example 7 of Kazenas Patent No. 2,938,873. The resin so obtained is heated to 150°–160° C., at which temperature there is added a dye combination of 0.97 gram of Rhodamine B Extra and 0.97 gram of Rhodamine 6GDN Extra (on the basis of 100 grams of resin), and the mixture is heated up to 180° C., and then cooled and powdered.

A charge consisting of a total of 300 parts by weight of the aforementioned powdered resin and 145 parts by weight of a 50% solids vehicle formed of commercial styrenated oil-modified alkyd in "Inkol-O" is subjected to high speed dispersion at 170° C. in order to obtain a uniform dispersion; and it is found that an extremely uniform particle size is obtained in the resulting dispersion.

EXAMPLE 24

As previously mentioned, a resin of reduced melting point or softening point may be obtained by a reduction (of course, by the reverse procedure an increase in softening point may be obtained) in the quantity of formaldehyde used and/or a reduction in the quantity of polyamino resin former used, in the case of such preferred resins as the aromatic sulfonamide-formaldehyde-polyamino resin former compositions. In addition, the softening point of these resins may be reduced and/or increased by adding thereto a suitable plasticizer, which may be fugitive, or by an increase in processing temperature, or by the addition of an additional chemical effecting further condensation of the resin. In each case, the reduction in the softening point of the resin will result in a reduction in the average particle size in the finally dispersed composition, assuming that all other process conditions remain the same. In each case where there is an increase in softening point, the formation of the discrete fine particles is not adversely affected as such formation takes place when the resin is still at a relatively low softening point. For example, if a resin is prepared in accordance with the procedure of Example 3 of Kazenas Patent No. 2,809,954, the resulting resin has a softening point of about 115° C. The softening point may be lowered about 15° C. by incorporating therein about 10 weight percent of the resin of a suitable plasticizer such as o- and p-toluenesulfonamide in which one of the amide hydrogens is replaced by an ethyl group. The plasticizer is incorporated into the resin by melting the same into the resin; either during the manufacture of the resin or during the manufacture of the ink. Thus a charge of 35 grams of a 44% styrenated alkyd vehicle in "Inkol-O," 5 grams of a mixture of N-ethyl ortho and paratoluenesulfonamide (Santicizer 8) and 50 grams of a pigment made in accordance with Example 3 of U.S. Patent No. 2,809,954 are heated with agitation to 160–165° C. and held until dispersion is completed. Heat is removed and while cooling to 140° C., 10 grams of boiled linseed oil are added and then 10 grams of "Inkol-O." It is found that the resulting size of the resin pigment spheroidal particles in the composition is 3 to 6 microns with a very nominal percent of particles outside of this range.

EXAMPLE 24A

A charge of 342 grams of o- and p-toluenesulfonamide, 126 grams of melamine and 95 grams of paraformaldehyde (95% active) was heated with stirring to a temperature of about 102° C. and then a 2.16 gram charge of Rhodamine B Extra was added with continued stirring and heating to uniformly disperse the dye in the resin. The heating was discontinued when a temperature of 103° C. was attained, and the resin allowed to cool to room temperature.

Then 60 grams of a vinyl toluene alkyd vehicle is heated, with constant stirring, to 130° C. To the heated vehicle a 50 gram pulverized portion of the aforementioned resin is added with continuous agitation and an accompanying temperature drop to 100° C., for a time sufficient to obtain a uniform dispersion. The heating and agitation are continued (for about 10–15 minutes) until a temperature of 130° C. is attained, at which point 8.6 grams of paraformaldehyde (95% active) is slowly added. The dispersion is then heated, with continued stirring (over an additional 10–15 minutes), to a temperature of 150° C. The heating and stirring are then discontinued and the dispersion is allowed to cool to room temperature. It is believed that the fine discrete dispersed phase pigment resin thus prepared is thermoset, thereby affording certain distinct advantages of the invention via comparative nominal (and belated) advancement of the condensation reaction.

The vinyl toluene vehicle used in this example is formed of a blend of 187 parts of a 42.8% solids styrenated alkyd vehicle in Magie oil 535 and 80 parts of 100% solids styrenated alkyd copolymer (SCOPOL 41 N).

As the reaction between the additional formaldehyde and the pigment resin does not take place to any appreciable extent until the pigment resin has been converted to molten state and dispersed as generally fine discrete spheroidal particles in the process, the ultimate fine spheroidal particle size of the pigment resin in the final product is not appreciably altered by this reaction and the reaction does not result in agglomeration or other undesirable side effects, but rather a substantial increase in the softening point of the pigment resin is achieved.

EXAMPLE 25

Comparable results are obtained if the procedure of the previous Example 24 is carried out except that the plasticizer used is a volatile material that is not necessarily retained in the resin at the end of the dispersing procedure and is thus termed a fugitive plasticizer. In such case, the fugitive plasticizer used is dimethylformamide (also in a quantity equal to 10 weight percent of the resin), but the high speed dispersion is carried out in a closed mixing vessel to avoid premature escape of the dimethylformamide. Preferably, when a uniform dispersion is obtained at the temperature of 160–165° C., the vessel may be opened to permit the escape of the dimethyl-formamide.

It will be appreciated that in the practice of the instant invention the plasticizer used, if such material is used, must be comparable in properties to the dyes used, in that the plasticizer will also have a much greater affinity for or solubility in the pigment resin that in any of the components of the vehicle. In this way the plasticizer will either tend to migrate toward the pigment resin or tend to be retained in the pigment resin during the dispersing procedure. Even if the plasticizer is a volatile material such as dimethylformamide, while the agitation is carried out in the closed vessel, and the dimethylformamide is retained in the system, it will be found that this material has a greater affinity for or solubility in the pigment resin than in the vehicle.

EXAMPLE 26

A charge of 85.5 grams of a mixture of o- and p-toluenesulfonamide is melted to 150° C., at which temperature a charge of 15.8 grams of paraformaldehyde (95% active) is added slowly with stirring. While still maintaining the temperature of approximately 115° C. an additional charge of 10.5 grams of melamine is added and the reaction mixture is then heated to 170° C., and there is added a dye combination of 1 gram of Rhodamine B Extra and 0.95 gram of Rhodamine 6GDN Extra. While maintaining a temperature of 170° C., the dye combination dissolves in the resin in about 10 minutes.

Before proceeding with the addition of the continuous phase of this example (as shown in the next paragraph) or with the demonstration of the use of the resin-forming reactant; paraformaldehyde is added to increase the dispersed resin melting temperature or softening point (as shown in the second paragraph hereafter); attention is directed to the fact that previous Examples 24, 24A and 25 hereof demonstrate alternatives in procedure for the resin preparation actually described in paragraph one of this Example 26. Thus, the resin used in this Example 26 may be that prepared according to Example 24, which has a depressed melting temperature via the inclusion of the compatible relatively permanent plasticizer; N-ethyl, o- and p-toluenesulfonamide. Using the procedure of Example 24A, the fine particle size is obtained prior to the addition of the further paraformaldehyde, which causes an increase in the softening point of the resin but does not affect the particle size. Alternatively, the resin used may be that prepared according to Example 25 using a resin melting temperature depressing plasticizer such as dimethylformamide. In the case of the dimethylformamide plasticizer described, it is apparent that this material is fugitive or so highly volatile at high speed dispersion temperature (of 170° C.) recited in the next paragraph that the dispersion is carried out in a closed vessel (as shown in Example 25), for the time involved in using this material as a melting-temperature-depressing plasticizer. On the other hand its volatile or fugitive nature is such that opening the vessel to permit substantial escape thereof necessarily results in (1) a loss of the dimethylformamide with (2) consequent increase in the melting temperature of the dispersed phase resin (previously plasticized thereby), which in turn, causes (3) some inherent cooling of the system through volatilization of the dimethylformamide plus (4) the predominant factor in accelerating the dispersed phase resin liquid-to-solid state conversion resulting from the increase in resin melting temperature effected by such loss of the volatile plasticizer. Although the nature of the process, the continuous vehicle, etc. are also involved, it will be appreciated that such accelerated conversion of liquid-to-solid state in the particles is advantageous in effecting the desired discrete fine (unagglomerated) spherulized solidified particles. It is equally apparent that these plasticizers of Examples 24 and 25 (or the addition of a chemical effecting the further condensation of the resin, as paraformaldehyde in Example 24A) have sufficient attraction for the resin such that they would not necessarily have to be introduced into the resin prior to contact with the continuous vehicle (as explained in the latter portions of Examples 24, 24A and 25); but preferably the plasticizers in each

17 case are first incorporated in the resin so as to obtain a melted or liquefied plasticized resin prepared for initial contact with the continuous vehicle. The molten or liquefied resin thus prepared in Example 24 has a significantly reduced melting temperature, as described; and it is apparent that the same is true in Example 25, only to a greater extent because of the greater compatibility (i.e., solvency) as well as volatility of dimethylformamide. Of course, in Example 24A the initially formed molten resin has a lower melting temperature than after the paraformaldehyde is added. It is thus pointed out that although the following two paragraphs of this Example 26 refer specifically to the use of the resin described in the first paragraph hereof, there is no inconsistency in substituting the procedures; in whole or in part, of Examples 24 or 25 for those of the first and third paragraphs hereof; and then (after the volatile dimethylformamide has been permitted to accelerate solidification of the dispersed phase resin by escaping), simply proceeding with the use of paraformaldehyde in the paint mill, as described in the fourth paragraph hereof to effect an ultimate increase in the resin softening point or melting temperature. Of course the procedure of Example 24A is also available as an alternate route. Alternatively, of course, the procedure outlined at the end of Example 2A hereof could be used to introduce the resin forming reactant (paraformaldehyde) into the dispersed phase resin during high speed dispersion, exactly as described therein.

Referring back to paragraph one of this example, a charge of 70 grams of a vehicle is added to the molten resin. The vehicle is a 44% solids commercial styrenated oil-modified alkyl in "Inkol-O," and the addition of the vehicle causes the temperature to drop. The material is subjected to high speed dispersion and thereby reheated to 170° C.

A paste is prepared of 9.7 grams of paraformaldehyde and 20.3 grams of boiled linseed oil on a three roller paint mill; and this paste is then added, during high speed dispersion, to the previously described dispersion. The temperature drops to about 135° C., but high speed dispersion is continued until the temperature rises to 170° C., at which it is held for approximately 10 minutes. Then the dispersion is cooled to 150° C., with stirring, and 25 grams of "Inkol-O" are added.

It is found that prior to the addition of the paste, an extremely uniform fine dispersed phase had been obtained. The high speed mixing of the paste into the system, however, is found to result in an improvement in the light fastness of the resulting product and also the incorporation of the paraformaldehyde of the paste results in an increase in the softening point of the resin in the dispersed phase.

EXAMPLE 27

A charge of 30 grams of a 44% solution of a styrenated alkyl resin in "Inkol-O," 1 gram Brilliant Yellow 6G base, 0.12 gram Rhodamine 6G, 0.3 gram Rhodamine B Extra and 50 grams dimethyl hydantoin-formaldehyde resin are heated with agitation to 140° C. and held there for about 5 minutes. A good dispersion is obtained of small particle size. Inks can be produced from this concentrate as previously described.

EXAMPLE 28

A dispersible pigment resin is made by taking a charge of 79 grams monomethylol dimethyl hydantoin and heating to 115° C., then slowly adding with stirring 31 grams paraformaldehyde (95% active) at 95–105° C.; then a charge of 171 grams of paratoluenesulfonamide is added slowly with continued stirring and heating to 185° C. and holding there until reaction is completed. This resin can be dispersed in the manner set forth in Example 1.

EXAMPLE 29

A dispersible pigment resin is made by taking a charge of 39.5 grams monomethylol dimethyl hydantoin and

18 heating to 115° C. then slowly adding with stirring 31.5 grams paraformaldehyde (95% active) and heating to 95–105° C.; then adding slowly with stirring 128.2 grams paratoluenesulfonamide and heating to 185° C. and holding there until reaction is completed. This resin can be dispersed in the manner set forth in Example 1.

EXAMPLE 30

A dispersible pigment resin is made by taking a charge of 158 grams of monomethylol dimethyl hydantoin and melting it is 145° C., and with stirring adding slowly 93.5 grams of benzoguanamine upon which addition to the temperature dropped to 125° C. 4.66 grams Brilliant Yellow 6G are added and the temperature is raised to 165° C. than 0.56 gram Rhodamine 6G and 1.40 grams Rhodamine B are added together to the reaction mass with three drops 70% phosphorous acid. The temperature is raised to 175° C. with stirring for 10 minutes and the resin mass is dumped. The resin can be dispersed in a manner hereinbefore set forth.

EXAMPLE 31

A dispersible pigment resin is made by taking a charge of 158.1 grams of monomethylol dimethyl hydantoin and heating it with stirring to 120° C.; then adding slowly with stirring 93.5 grams benzoguanamine. The temperature is raised with stirring to 185° C. then 2.33 grams Brilliant Yellow 6G base is added. The temperature is allowed to drop and 0.559 gram Rhodamine 6G and 1.398 grams Rhodamine B Extra added at 160° C. There is then added 4 grams of paraformaldehyde (95%) slowly. The mixture is heated to 175° C. with stirring and held for about 10 minutes. This resin has a higher melting point and is more heat-stable than the resin of Example 30. The resin can be dispersed in a manner hereinbefore set forth.

EXAMPLE 32

A charge of 22.6 grams monomethylol dimethyl hydantoin is heated to 115° C. With stirring 4.6 grams paraformaldehyde (95% active) is added slowly and the temperature dropped to 100° C. Then 122.1 grams paratoluenesulfonamide is slowly added with stirring, after which 31.0 grams of a A-stage unmodified melamine-formaldehyde resin (Resimene 814) is slowly added, followed by 13.7 grams paraformaldehyde (95% active). The temperature is raised and 3.5 grams of Brilliant Yellow 6G base are added at 110° C. and 0.54 gram Rhodamine 6G and 1.05 grams Rhodamine B Extra are added at 145° C. The melt is heated to 175° C. and held for 10 minutes and then dumped.

This resin can be dispersed into an ink as previously described.

EXAMPLE 33

A charge of 30 grams of a 44% solution of a styrenated alkyd resin in "Inkol-O," 40.8 grams paratoluenesulfonamide, 1.0 gram Brilliant Yellow 6G base, 0.17 gram Rhodamine 6G and 0.3 gram Rhodamine B Extra are heated with stirring to 140° C. There is then added slowly a charge of 8.4 grams of an A-stage unmodified melamine-formaldehyde resin (Resimene 814) and the temperature allowed to drop to 120° C. at which time 7.6 grams paraformaldehyde (95% active) is slowly added. The mixture is heated with agitation to about 170° C. and held for 10 minutes when dispersion is complete. This concentrate can be formulated into an ink as previously described.

As indicated previously, the styrenated oil-modified alkyd resins of the type described in Hart U.S. Patent Nos. 2,919,253 and 2,944,991 have been found to be particularly suitable for use as the solid-film-forming resin or second resin in the practice of the instant invention. Such styrenated alkyds are formed of a glyceride oil-modified alkyd resin that is copolymerized or coreacted with a styrene component selected from the group consisting of styrene, ring substituted alkyl styrenes and ring substituted chlorostyrenes. These materials may be prepared with or without the divinyl benzene component mentioned in Hart Patent No. 2,919,253, and the resins may be employed in any of the solvents specified in these Hart patents.

EXAMPLE 34

A charge of 321 grams of paratoluenesulfonamide and 1.4 grams hexamethylene tetramine were heated to 137–140° C. Then 8.08 grams Brilliant Yellow 6G base, 1.29 grams Rhodamine 6GDN and 2.42 grams Rhodamine B Extra were added and stirred for 5 minutes. Then 67.6 grams of an A-stage unmodified melamine-formaldehyde resin were added with stirring while the temperature dropped to 122° C. Then 65.2 grams of paraformaldehyde (95% active) were added slowly with stirring while the temperature dropped to 110° C. The heat was increased and at 150° C. two drops of 70% phosphorous acid were added. At 178–180° C. the material was dumped.

An ink concentrate was prepared by heating and agitating 60 grams of a 40% solution of Alpex in boiled linseed oil, 100 grams of the above pigment in pulverized form to 180° C. On cooling, at 150° C., 40 grams of boiled oil were added with slow stirring. This concentrate, by the addition of suitable thinners, dryers and the like can be formulated into a printing ink. In this formulation the drying oil is the solvent for the solid-film-forming resin.

EXAMPLE 35

If in the preparation of the resin of Example 18, one adds 2 grams of 2,2'-dihydroxy, 4,4'-dimethoxy benzophenone at 145° C., one obtains a resin that absorbs fluorescigenous energy in the range of 3000 to 4000 Angstroms.

An "overprint" varnish made with such a resin, in accordance with Example 18 will produce a substantially clear overprint varnish that will protect the underlying surface from electromagnetic radiations in the near ultraviolet.

EXAMPLE 36

A charge of 160.5 grams of mixed o- and p-toluenesulfonamide and 0.7 gram of hexamethylene tetramine were melted to 112° C. A charge of 201.5 grams of Cadmium Selenid Medium Red Pigment No. 1422 (Harshaw Chemical Co.) was dispersed and then 32.6 grams of paraformaldehyde (95% active) was added slowly with stirring. Then a charge of 29.0 grams of an A-stage unmodified melamine-formaldehyde resin was added and the temperature allowed to rise to 180° C. where it was held for 10 minutes.

A charge of 30 grams of a 44% solution of a styrenated alkyd in "Inkol-O" and 50 grams of the above resin were vigorously agitated with heating to 175° C. and held for 10 minutes. On cooling there was added, with mild agitation, 10 grams of boiled linseed oil and 10 grams of "Inkol-O." The resultant concentrated material can be used to make a conventional printing ink by the addition of dryers, thinners and the like. 2.4 parts of the concentrate was diluted with 2 parts "Inkol-O" and 1 part of xylol and observed under a 400 power microscope. It appears that the inorganic pigment has been retained by the sulfonamide-formaldehyde melamine resin rather than migrating to the ink vehicle.

It will be appreciated that the final particle size in this example is dependent upon the particle size of the pigment used to color the resin. The final particle cannot be smaller than the colored pigment particle. Accordingly, it is necessary to use coloring pigments with a very fine particle size to obtain uniform fine particle size in the concentrate and in the finished ink.

In the practice of the instant invention, the temperature employed during agitation and particularly the maximum temperature, is a significiant factor in controlling the average particle size ultimately obtained. Meltable organic resins which may be thermoplastic, thermosetting and thermoset do not ordinarily have a sharp melting point and the fluidity of such resins in the molten state is increased as the temperature thereof is increased. In the practice of the invention it is ordinarily preferable to employ a maximum temperature during the vigorous agitation in the range of approximately 50 to 100° C. above the softening point of the pigment resin, but in any event it is best to employ a temperature above 100° C. In the practice of the instant invention, the mode, speed, intensity and duration of the agitation during the dispersing step are further factors in controlling the average particle size ultimately obtained. Generally speaking, longer and more vigorous agitation, at the high temperature, leads to smaller particle size.

In the practice of the instant invention, it is preferable to employ a completely cocondensed meltable pigment resin of a sulfonamide-formaldehyde-polyamido resin former type. The condensate is formed of $x$ mols of the aromatic monosulfonamide component, $y$ mols of a poly-$NH_2$ type of the polyamido resin former component, and an amount of the formaldehyde component preferably of at least about a total of $x$ or more. Still more formaldehyde up to a total of about $x$ plus $3y$ may be used in certain instances. Any excess of formaldehyde over and above that required for the reaction is ordinarily volatilized at reaction temperatures and does not result in any harmful effect upon the ultimately produced resin. The completely cocondensed resin is preferred in the practice of the instant invention for the reason that it is truly an integral resin body, rather than a mixture of resins, and as such it possesses greater light and heat stability as well as solubility in certain solvents and substantial insolubility in others.

It has been found, however, that there are some advantages in the practice of the instant invention in carrying out the initial vigorous agitation using a dispersed phase resin that has a somewhat lower softening point as exemplified by Examples 24, 24A, 25 or Examples 2a or 4, than that which might be desired in a finished paint or ink product. An acceptable way of accomplishing this involves the use of an initial dispersed phase resin having a slight deficiency in formaldehyde, but being capable of further reaction with formaldehyde (after the desired particle size has been accomplished) during the final stages of the process so as to obtain pigment resin having the desired softening temperature in the final product. This may be accomplished by using, instead of the minimum quantity of formaldehyde just described, a quantity of the farmaldehyde component that is equivalent to a total ranging from about $x$ mols to a total of about $x$ plus $\frac{1}{2}y$ mols. A resin prepared having this deficiency in formaldehyde has a lower melting or softening point. After the dispersion has been carried out, and while the dispersed phase resin is still ina molten state, additional formaldehyde may be added to the system in order to effect the formation of a completely condensed dispersed phase pigment resin. In the practice of the invention, mild agitation of the dispersion is continued, during the cooling process, until the dispersed phase pigment particles are cooled to such an extent that they have little or no tendency to agglomerate; and in employing this procedure, the reaction with additional formaldehyde does not result in harmful effects, agglomeration, etc.

In the production of the preferred meltable resin for use as the dispersed pigment resin, it is advantageous to employ, in conjunction with the formaldehyde component, $x$ mols of the sulfonamide component and $y$ mols of the polyamino resin former component (i.e., preferably polyaminotriazine component) in a ratio such that $y$ is substantially equal to from $0.17\times$ to $0.5\times$ (or $0.6\times$), in order to have a dispersed pigment resin possessing advantageous properties in light and heat stability as well as solubility in certain solvents and substantial insolubility in certain other solvents useful in the continuous phase (which include aliphatic and aromatic hydrocarbon solvents).

Another feature of the instant invention which significantly affects the ultimate particle size of the dispersed pigment resin is the viscosity of the continuous phase and the manner in which it is affected by the concentration of solid-film-forming or second resin therein. In the liquid vehicle continuous phase, a solid-film-forming or second resin is incorporated which imparts thereto a viscosity suitable for producing the desired shearing effect for fine particle production. A preferred composition suitable for use as a liquid vehicle for an ink may have a total solids content of approximately 50% and this should be a free flowing compositon. Actually, the total weight percent of film-forming solids may range from about 5 or 10% of high molecular material to as much as even 100% of a low molecular weight material in various ink vehicle compositions. In carrying out the agitation at an elevated temperature, however, a relatively high solids content or high molecular weight material in the liquid vehicle continuous phase is preferred in order to impart the necessary viscosity to this phase. It will be appreciated that the total solids content of a final ink formation, includes the solid dispersed pigment resin plus the solids dissolved in the continuous liquid vehicle phase. In the practice of the instant invention, during the agitation, it is possible to employ a "concentrate" composition, wherein the weight ratio of dispersed phase to liquid vehicle continuous phase may range from 1:1 to about 2:1, and in such a "concentration," the liquid vehicle continuous phase which contains dissolved solids preferably has a solids to liquid weight ratio of 2:3 to 3:2, overall, but ordinarily using proportionately greater vehicle solids ratios for proportionately greater ratios of products $x$ to vehicle $x$ (over the aforesaid range). As indicated herein the preferred amount of vehicle solids is the amount effective also to function in the solid-film-forming capacity described which includes the ability to bind the pigment particles to the surface to which the instant dispersion is ultimately applied.

The dispersed pigment resin in its normal state is a solid (or supercooled liquid). In color compositions it is the dye carrying phase which is more receptive of and has a greater affinity or solubility for the dyes than the liquid continuous phase. This dispersed or discontinuous pigment resin is not compatible (i.e., not soluble therein when it is in solid form or molten form) with the liquid continuous phase under the ordinary conditions of use and it may be opaque or transparent depending upon the coloring material used. In addition, the dispersed pigment resin is preferably polar but not ionic.

In contrast, the continuous liquid phase is a vehicle or binder for the dispersed pigment resin, when ultimately used in a color composition such as a paint, ink, etc. When dyes are used, they preferably have a much greater affinity for the dispersed pigment resin phase than for the continuous liquid phase. The continuous liquid phase is transparent, or at least sufficiently light transmitting to permit the color of the dispersed pigment resin to be observed. Also, the continuous liquid phase is preferably substantially nonpolar.

The continuous liquid phase preferably is formed of solid-film-forming resin combined with and/or dissolved in a liquid solvent. The liquid solvent can be a comparatively volatile material (such as petroleum fractions, etc.), although less volatile than a fugitive dispersed phase plasticizer, or a nonvolatile material (such as drying oils, liquid polymers, etc.). The solid-film-forming components preferred for use in the liquid continuous phase include such organic resins as the vinyl toluene copolymers, oil-modified alkyd resins, isophthalic long oil modified alkyd resins, cyclized rubber, and the like, all of which resins are preferably not highly thermoreactive under the conditions of the instant method, or at least are not so sensitive to the heat employed during the agitation at an elevated temperature as to react, thermoset, cure or otherwise interfere with the carrying out of the agitation step. These solid-film-forming resins, however, are capable of carrying out their essential function by air drying, curing, or otherwise hardening in the ultimately used paint or ink composition.

It has also been found that better results are obtained in the practice of the instant invention, if the dispersed pigment resin as well as the solid-film-forming resin component dissolved in the liquid continuous phase both have molecular structures which contain aromatic or cyclic groups. For example, the solid-film-forming resin in the continuous liquid phase is preferably one containing an aromatic group, such as the benzene nuclei present in vinyl toluene resins and in various alkyd resins (having a phthalic acid component). In such resins the aromatic benzene nuclei are attached to non-polar groups such as vinyl groups, or substantially non-polar groups such as drying oil acyl groups (which would be attached to the benzene nucleus of the phthalic acid component through an ester linkage). The resulting resinous material is non-polar. In contrast, in the preferred dispersed pigment resin there are also aromatic or cyclic groups. The aromatic or cyclic groups of the preferred dispersed pigment resin include the benzene nuclei of toluenesulfonamide groups and the triazine nuclei of the aminotriazone component. In each case, these nuclei have attached thereto polar groups such as the sulfonamide groups or the amino groups, and in the systems here involved these resins are apparently polar in character.

The term selective light absorbing agent as employed herein and in the claims is to be understood to mean materials which absorb electromagnetic radiation (both visible and invisible) such as for example ultraviolet absorbers, infrared absorbers, opacifiers, reflecting agents, powdered metals, pigments, dyestuffs and other coloring agents (which would be radiation in the range of about 3200 to 8000 or 10,000 A.).

The term coloring agent as employed herein and in the claims is to be understood to mean materials such as, for example, pigments and dyestuffs (with or without associated reflecting and opacifying agents) which impart color or hue to the dispersed phase. The term fluorescent agent is to be understood to mean materials which impart to the dispersed phase the property of emitting visible light under fluorescigenous energy. The term daylight fluorescence is to be understood to mean materials which impart to the dispersed phase the property of exhibiting color due to the phenomenon of selective reflection and absorption as well as fluorescence in response to visible light (i.e., natural sunlight or artificial polychromatic light generally referred to as "white" light), which would be dissipated as heat by subtractive colors.

It will be understood that modifications and variations may be effected without departing from the spirit and scope of the novel concepts of the present invention.

We claim:

1. A method of producing an improved solid-film-forming dispersion of solid particles in a liquid vehicle, which comprises agitating a dispersed phase of normally solid meltable synthetic organic resin in molten form in a continuous phase that is formed of an organic solid-film-forming normally liquid vehicle in which the dispersed phase is substantially insoluble, while maintaining said vehicle in liquid form, converting the dispersed phase vehicle from molten to solid state, and promoting conversion of the dispersed phase resin to the solid state by addition of a separate resin-forming reactant to the dispersed phase resin to effect a chemical reaction raising the dispersed phase resin melting temperature.

2. The method of claim 1 wherein conversion of the dispersed phase resin to the solid state is also promoted by cooling after effecting such chemical reaction.

3. The method of claim 1 wherein said separate resin-forming reactant is formaldehyde.

4. The method of claim 1 wherein said continuous phase is formed of a second organic resin dissolved in a liquid organic solvent.

5. The method of claim 1 wherein a temperature increase is employed in combination with the agitation to promote formation of the dispersed phase in the molten state and in relatively discrete, fine spheroidal particle size and cooling of the resultant dispersion is then carried out to promote molten-to-solid conversion of the dispersed phase while retaining such relatively discrete fine particle size.

6. The method defined in claim 1 including contacting the dispersed solid meltable resin with at least one dye which has greater affinity for the meltable resin than the continuous phase organic solid-film-forming liquid vehicle.

7. A method of claim 6 wherein the dye is dissolved in the meltable synthetic organic resin prior to dispersion.

8. A method of claim 6 wherein the dye consists of at least one daylight fluorescent dye in concentrations effective for daylight fluorescence.

9. A method of claim 6 wherein the dye is dispersed in the continuous liquid vehicle.

10. The method of claim 1 wherein a selective light absorbing agent is incorporated in said dispersed phase, which dispersed phase is capable of retaining such selective light absorbing agent and substantially preventing such agent from migration into the continuous phase.

11. The method of claim 10 wherein such selective light absorbing agent consists of a coloring agent.

12. The method of claim 1 wherein the continuous phase vehicle is formed of a solid-film-former that is an oil-modified alkyd resin.

13. The method of claim 1 wherein the dispersed phase is formed of an aromatic resin and the continuous phase vehicle is composed of at least substantially 50 weight percent oil-modified benzenoid alkyd resin.

14. A method of producing an improved solid-film-forming dispersion of solid particles in a liquid vehicle, which comprises agitating a dispersed phase of normally solid meltable synthetic organic resin in molten form in a continuous phase that is formed of an organic solid-film-forming normally liquid vehicle in which the dispersed phase is substantially insoluble, while maintaining said vehicle in liquid form, incorporating a compatible fugitive plasticizer in the dispersed phase resin for depressing the melting temperature thereof and facilitating formation of fine liquefied discrete particle size thereof as a dispersed phase in such continuous phase vehicle, and converting the dispersed phase from molten to solid state, such conversion to solid state being promoted by escape of such fugitive plasticizer from the dispersed phase prior to completion of such conversion.

15. The method of claim 14 wherein such conversion to solid state is also promoted by cooling.

16. The method of claim 14 wherein such plasticizer is a volatile material incorporated into the dispersed phase resin prior to admixing with and agitation in the continuous vehicle to accelerate discrete fine dispersed particle production therein.

17. The method of claim 16 wherein a temperature increase is also used in combination with agitation to accelerate discrete fine dispersed particle production in the continuous phase.

18. The method of claim 14 wherein a selective light absorbing agent is incorporated in said dispersed phase, which dispersed phase is capable of retaining such selective light absorbing agent and substantially preventing such agent from migration into the continuous phase.

19. The method of claim 18 wherein such selective light absorbing agent consists of a coloring agent.

20. The method of claim 14 wherein the continuous phase vehicle is formed of a solid-film-former that is an oil-modified alkyd resin.

21. The method of claim 14 wherein the dispersed phase is formed of an aromatic resin and the continuous phase vehicle is composed of at least substantially 50 weight percent oil-modified benzenoid alkyd resin.

22. The method of claim 19 wherein said coloring agent consists of at least one dye.

23. The method of claim 22 wherein said dye consists of at least one daylight fluorescent dye in concentrations effective for daylight fluorescence.

24. The method of claim 14 wherein said continuous phase is formed of a second organic resin dissolved in a liquid organic solvent.

25. The method of claim 11 wherein said coloring agent consists of at least one dye.

26. The method of claim 25 wherein said dye consists of at least one daylight fluorescent dye in concentrations effective for daylight fluorescence.

References Cited

UNITED STATES PATENTS

| | | | |
|---|---|---|---|
| 2,653,919 | 9/1953 | Hunter | 260—23 |
| 2,776,267 | 1/1957 | Weber et al. | 260—21 |
| 2,844,541 | 7/1958 | Work | 252—314 |
| 2,938,873 | 5/1960 | Kazenas | 252—301.2 |
| 2,600,593 | 6/1952 | Weber | 260—39 |

OTHER REFERENCES

Fischer: "Colloidal Dispersions," 1950, p. 265.

TOBIAS E. LEVOW, *Primary Examiner.*

ROBERT D. EDMONDS, *Assistant Examiner.*

UNITED STATES PATENT OFFICE
CERTIFICATE OF CORRECTION

Patent No. 3,412,034  
November 19, 1968

Maurice Dwight McIntosh et al.

It is certified that error appears in the above identified patent and that said Letters Patent are hereby corrected as shown below:

Column 3, line 14, "th" should read -- the --; line 73, "pigments" should read -- pigment --. Column 4, line 13, "Kazanas" should read -- Kazenas --; line 15, "components" should read -- component --. Column 6, line 26, "dsipersed" should read -- dispersed --. Column 7, line 3, "were" should read -- was --. Column 9, line 9, "utimately" should read -- ultimately --. Column 10, line 20, "moles" should read -- mols --; line 42, cancel "a"; line 43, "(semidrying" should read -- (a semi-drying --; line 44, "copolymtrized" should read -- copolymerized --. Column 11, line 70, "temperautre" should read -- temperature --. Column 12, line 9, after "and" insert -- the --; line 10, "disperson" should read -- dispersion --; line 74, "'cycopol'" should read -- "Cycopol" --. Column 13, line 59, "aded" should read -- added --. Column 17, lines 32 and 55, "alkyl", each occurrence, should read -- alkyd --. Column 18, line 1, "clowly" should read -- slowly --; line 11, "is" should read -- at --; line 12, after "addition" cancel "to"; line 15, "than" should read -- then --; line 43, "a" should read -- an --; line 55, "alkyld" should read -- alkyd --. Column 20, line 47, "farmaldehyde" should read -- formaldehyde --; line 52, "ina" should read -- in a --; line 68, "x", each occurrence, should read -- x --. Column 21, line 20, "formation" should read -- formulation --; line 27, "'concentration'" should read -- "concentrate" --; line 31, "products" should read -- product --.

Signed and sealed this 2nd day of June 1970.

(SEAL)  
Attest:

EDWARD M. FLETCHER, JR.  
Attesting Officer

WILLIAM E. SCHUYLER, JR.  
Commissioner of Patents